Jan. 7, 1958  H. C. A. HOLLEMAN  2,818,656
PROCESS OF SEPARATING VOLATILE COMPONENTS FROM
LESS VOLATILE COMPONENTS BY DISTILLATION OR
SUBLIMATION AT A LOW PRESSURE
Filed March 23, 1954
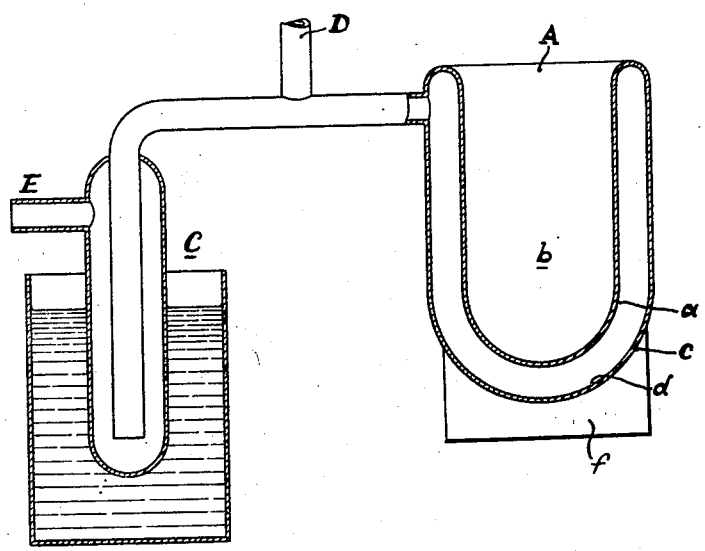
INVENTOR
HERMAN CORNELIS
ARNOLD HOLLEMAN
BY
AGENT United States Patent Office 2,818,656
Patented Jan. 7, 1958

2,818,656

PROCESS OF SEPARATING VOLATILE COMPONENTS FROM LESS VOLATILE COMPONENTS BY DISTILLATION OR SUBLIMATION AT A LOW PRESSURE

Herman Cornelis Arnold Holleman, Eindhoven, Netherlands, assignor, by mesne assignments, to North American Philips Company, Inc., New York, N. Y., a corporation of Delaware Application March 23, 1954, Serial No. 418,044

Claims priority, application Netherlands April 8, 1953

4 Claims. (Cl. 34—5)

This invention relates to a process of separating volatile components from less volatile components by distillation or sublimation at a low pressure in two successive phases, use being made of short-way-high-vacuum distillation during the first phase.

Short-way-high-vacuum distillation is a technique which is known per se. In such processes there prevails so low a pressure in the distillation room, for example lower than 0.2 mm. of mercury pressure, and so low a mean temperature between the evaporating and condensing surfaces that the mean free length of the path traversed by the particles of the distillating vapour is at least of the order of magnitude of the mean distance between the said surfaces, that is to say at least ⅕ of this distance.

Several solutions have been suggested for carrying off the distillate of the condensing surface from the separation room. Thus, a process of distilling under high vacuum is known which utilises an apparatus in which the evaporating and condensing surfaces are relatively movable, thus enabling the distillate to be led out of the distillation room proper. Further it has been proposed to use rotary condensing surfaces, the liquid distillate being hurled into a discharge chute and thus enabled to be led out of the distillation room. The present invention relates to a solution which does not require the use of a complicated equipment.

The invention relates to a process of separating volatile components from less volatile components by distillation or sublimation at a low pressure in a vessel which comprises a surface for carrying a mixture of components, a surface for condensing thereon a volatile component and furthermore an outlet tube for exhaustion and for carrying off the vapour of the volatile component from the distillation room, which distillation takes place in two phases, the mixture of components being subjected to a short-way-high-vacuum distillation and the volatile component being condensed on the surface intended therefor during the first phase and the resultant condensate being removed from the vessel during the second phase by exposing it to a temperature such that the free length of the path traversed by the particles of the volatile component is comparatively smaller than that during the first phase, whilst furthermore the vapour pressure of the volatile component at the area of condensation during the first phase is higher than that at the area to which it is led outside the vessel.

In order that the invention may be readily carried into effect, it will now be described with reference to the accompanying drawing, given by way of example. The temperature at the beginning of the second phase is increased—and thus the mean free length of path decreased—to such an extent, that the conditions under which short-way-high-vacuum distillation or sublimation can be carried out have disappeared. The direction of the decline in temperature between the evaporating and condensing surfaces must of course be maintained, since otherwise distillation of the volatile components from the condensing surface to the evaporating surface would result. Under these new conditions of temperature, the volatile component is discharged from the vessel by taking care that the vapour pressure of the volatile component in direct proximity to the area of condensation during the first phase is higher than that at the area outside the vessel to which it is to be carried off.

The invention affords advantages more particularly for drying thermo-instable biological preparations, for example tissue cultures and suspensions of virus. The substance to be dried is preferably applied to the evaporating surface as a thin layer.

In one preferred embodiment of the invention, an ordinary Watt distillation takes place during the second phase. This is achieved by a temperature of the volatile component to be distilled which is higher than the temperature of condensation outside the vessel.

In another embodiment the vapour of the condensate produced during the first phase is brought in contact with a substance outside the vessel which has a greatly absorbing effect upon the volatile component.

If the volatile component is water, the absorbing material used may be, for example, phosphorous oxide or concentrated sulphuric acid.

It is furthermore advantageous if the mixture to be subjected to the separation is maintained, during the first phase, at a temperature of at the most −50° C. and the surface on which the volatile component will deposit is maintained at a temperature of at the most −60° C. in such manner that the condensing surface invariably has a temperature lower than that of the evaporating surface, and if, during the second phase, the mixture from which the volatile component has been driven out is maintained at a temperature of at the most +40° C. and the surface on which the volatile component has deposited during the first phase is maintained at the temperature of at the most −1° C., the evaporating surface having a temperature higher than that at the area of condensation of the volatile component also during the second phase.

In a further preferred embodiment of the invention, the process is carried out in a vessel in which the evaporating and condensing surfaces are parts of one and the same surface which has a shape such that a particle of the volatile component leaving the evaporating surface can always reach the condensing surface in a straight line. Satisfactory results are obtained if the separation is carried out in the intermediate space of a double-walled vessel similar to a Dewar vessel. After the volatile component has been removed, the distillation residue may be kept in the vessel. This is advantageous more particularly in the manufacture of dried biological preparations, since the vessel may also serve as an ampulla.

In this case it is preferable, in order to avoid disintegration, to bring the contents of the vessel under vacuum or to fill the vessel with a gas which is chemically non-reactive such as nitrogen, and to shut off the whole from the atmosphere, for example by sealing off a glass outlet tube. Preparations thus manufactured and shut off from the atmosphere are durable for a very long time.

*Example*

An arrangement is made such as shown diagrammatically in the figure. A indicates a double-walled vessel similar to a Dewar vessel, of which the space between the walls communicates with a cooling vessel C which is cooled by liquid air and which communicates at E with a high-vacuum pump (not shown.) The equipment is connected at D to a MacLeod manometer.

In the intermediate space of the vessel a thin adsorbed layer of 0.20 ccm. of a virus suspension is provided at *a* and locally maintained at a low temperature with the use of a bath containing alcohol and solid carbon dioxide. The bath is contained in the interior space $b$ and has a temperature of about —75° C. After having pumped up to a pressure of about $10^{-3}$ mm. of mercury, the outer wall $c$ is maintained at a low temperature by means of a bath $f$ containing liquid nitrogen having a temperature of about —195° C. After some moments a deposit of ice forms at $d$ which is gradually growing. The said conditions of temperature and pressure are maintained for about 1 hour. Subsequently, the bath containing alcohol and solid carbonic acid is removed and the liquid nitrogen replaced by a bath of alcohol having a temperature of about —25° C. The wall $a$ is left in free heat-exchange with air of room temperature. The indication of the MacLeod manometer remains unchanged After about 1½ hours the ice is found to be completely disappeared from the wall at $d$; furthermore the dried preparation does not contain water any longer. As appeared from the determination of the weight of the Dewar vessel, only the amount of dry substance which was contained in the virus solution, introduced into the vessel at the beginning of the test is left.

A comparative test was carried out with the same amount of the aforementioned virus solution in which the wall was cooled at $d$ for more than two hours with the use of a bath of alcohol and solid carbon dioxide of approximately —75° C. contained in $b$. The wall $c$ was approximately at room temperature. However, after the test was finished, it was found that substantially no ice had disappeared from the vessel, its weight being substantially the same since the beginning of the test.

What is claimed is:

1. A process for the rapid drying of thermo-unstable biological material comprising the steps, placing the material on a first internal surface of a highly-evacuated vessel, cooling said surface and cooling a second internal surface of said vessel, spaced from said first surface, to a temperature below that of said first surface while maintaining both of said surfaces at a temperature so low that the mean free path of the molecules of the volatile constituent between said surfaces is of the order of the distance between said surfaces until said volatile constituent has evaporated and condensed on said second cooler surface, and then increasing the temperature of said second surface to a point below the decomposition temperature of said material but high enough to cause evaporation of the condensed volatile constituent and condensation thereof in a second connecting evacuated vessel maintained at a temperature sufficiently low to provide a lower vapor pressure than that surrounding said second surface and increasing the temperature of said first surface to a point above that of said second surface but below the decomposition temperature of said material.

2. A process for the rapid drying of thermo-unstable biological material comprising the steps placing a thin layer of the material on a first internal surface of a highly-evacuated vessel, cooling said surface and cooling a second internal surface of said vessel, spaced from said first surface, to a temperature below that of said first surface while maintaining both of said surfaces at a temperature so low that the mean free path of the molecules of the volatile constituent between said surfaces is of the order of the distance between said surfaces until said volatile constituent has evaporated and condensed on said second cooler surface, and then increasing the temperature of said second surface to a point below the decomposition temperature of said material but high enough to cause evaporation of the condensed volatile constituent and condensation in a second connecting evacuated vessel maintained at a temperature sufficiently low to provide a lower vapor pressure than that surrounding said second surface and increasing the temperature of said first surface to a point above that of said second surface but below the decomposition temperature of said material.

3. A process for the rapid drying of thermo-unstable biological material comprising the steps placing a thin layer of the material on a first internal surface of a highly-evacuated vessel, cooling said surface and cooling a second internal surface parallel to said first surface of said vessel, spaced from said first surface, to a temperature below that of said first surface while maintaining both of said surfaces at a temperature so low that the mean free path of the molecules of the volatile constituent between said surfaces is of the order of the distance between said surfaces until said volatile constituent has evaporated and condensed on said second cooler surface and then increasing the temperature of said second surface to a point below the decomposition temperature of said material but high enough to cause evaporation of the condensed volatile constituent and condensation thereof in a second connecting evacuated vessel maintained at a temperature sufficiently low to provide a lower vapor pressure than that surrounding said second surface and increasing the temperature of said first surface to a point above that of said second surface but below the decomposition temperature of said material.

4. A process for the rapid drying of a thermo-unstable biological material comprising the steps, placing a thin layer of the material on a first internal surface of a highly-evacuated vessel, cooling said surface to a temperature of not more than —50° C. and cooling a second internal surface spaced from said first surface to a temperature of not more than —60° C. while maintaining said temperatures to provide a mean free path for the molecules of a volatile constituent of said material between said surfaces in the order of the distance between said surfaces until said volatile constituent is evaporated and condenses on said second cooler surface and then increasing the temperature of said first surface to a temperature of not more than 40° C. and increasing the temperature of said second surface to not more than —1° C., to effect volatilization of the condensate on the second surface and evaporation into a second connecting evacuated vessel maintained at a temperature sufficiently low to provide a lower vapor pressure than that surrounding said second surface.

References Cited in the file of this patent

UNITED STATES PATENTS

| 2,345,548 | Flosdorf et al. | Mar. 28, 1944 |
| 2,616,604 | Folsom | Nov. 4, 1952 |

FOREIGN PATENTS

| 78,918 | Netherlands | Aug. 15, 1955 |

OTHER REFERENCES

Freeze-Drying by Flosdorf, copyright 1949, pages 14 to 67 and 174 to 180 relied on.